UNITED STATES PATENT OFFICE.

WALTER E. MASLAND, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

PROCESS OF ACETYLATION.

1,095,013. Specification of Letters Patent. Patented Apr. 28, 1914.

No Drawing. Application filed October 16, 1912. Serial No. 726,012.

*To all whom it may concern:*

Be it known that I, WALTER E. MASLAND, of Wilmington, in the county of Newcastle and in the State of Delaware, have invented a certain new and useful Improvement in Processes of Acetylation, and do hereby declare that the following is a full, clear, and exact description thereof.

My invention relates particularly to the acetylation of chlorhydrocarbons obtained from hydrocarbons of the paraffin series, although it is applicable to the acetylation of many other different compounds.

The object of my invention is to bring about the acetylation of compounds of the above character, and especially those derived from certain members of the paraffin series of hydrocarbons, in an advantageous manner.

My invention is particularly applicable to obtaining pentyl and hexyl acetates amylene and hexylene diacetates as well as certain unsaturated hydrocarbons and unsaturated chlorhydrocarbons which are formed in the reaction, although it is also applicable to obtaining acetates in general.

My invention is applicable to the treatment of monochlorhydrocarbons and dichlorhydrocarbons as well as many other halogen substitution products of organic compounds.

Certain objects of my invention are to effect the acetylation of the compound treated at a lower pressure and therefore in apparatus which need not be quite so strong as has been previously found necessary.

Stated otherwise, the object of my invention is to permit a larger charge of material to be treated in a vessel of a given size and a given strength, without increasing the maximum pressures produced.

I have discovered that in the process of acetylation, the olefins and chlorolefins are formed more rapidly and at a lower temperature than the acetates and the diacetates. In carrying out my process, I therefore conduct the treatment in such a manner as to produce the olefins at a low temperature, then remove them, and subsequently raise the temperature to effect the reaction which results in the production of the acetates.

As one illustrative embodiment of my invention, I will describe it as applied to the treatment of monochlorhydrocarbons derived from hydrocarbons of the paraffin series such, for example, as the monochlor derivatives of pentane and hexane and their homologues. Assuming that pentane, isopentane, hexane and isohexanes have been obtained by fractionation of a mixture of hydrocarbons such, for example, as gasolene, and that they have been subjected to chlorination by treatment with chlorin in the presence of light to produce monochlorhydrocarbons, and that the products thus obtained are distilled to separate the monochlorhydrocarbons from the remaining products, these monochlorhydrocarbons are subjected to acetylation in the following manner: The monochlorhydrocarbons are placed in a vessel with a quantity of acetic acid which may have a concentration, if desired, as low as 70%, and a quantity of preferably dry sodium acetate. The vessel is then heated by means of a steam jacket with steam at the usual pressure of approximately 100 pounds, and at a temperature of about 150° C. This treatment is continued for several hours. The olefins are thus formed in accordance with the following formula from some of the chlorhydrocarbons:

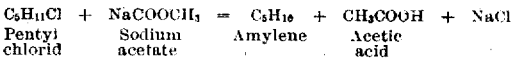
Pentyl   Sodium   Amylene   Acetic
chlorid   acetate                      acid In the case of the treatment of these particular hydrocarbons the reaction of the first step takes place between approximately the temperature of 100° C. as a minimum and 150° and 170° C. as a maximum.

The olefins thus formed are then removed as far as possible by distillation at preferably 100° C. Then the remainder of the charge is brought up to the usual reaction temperature of about 180° C. or higher, by the use of superheated steam, or steam at about 250 pounds pressure. The main reaction taking place in this second portion of the process is the following:

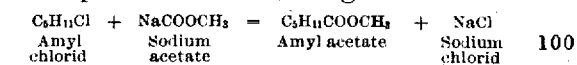
Amyl    Sodium     Amyl acetate   Sodium
chlorid   acetate                            chlorid After completed acetylation, the volatile products may be distilled and the distillate thus obtained comprising principally acetates, as well as some chlorhydrocarbons, may be thereafter utilized or treated in any desired manner, for example, the acetates may be obtained in pure form by means of fractional distillation of the product.

It will be found that when the process is carried out in this manner a much lower maximum pressure is obtained in the vessel than if the same amount of charge had been treated in the usual manner so as to obtain the main body of olefins with the remainder of the products. If it is found desirable to work at the high pressures ordinarily obtainable then a much larger charge may be utilized in the first instance without increasing the pressures which ordinarily obtain.

While I have described my invention above in detail, I wish it to be understood that many changes may be made therein without departing from the spirit thereof.

I claim:

1. The process which comprises heating a mixture of halogen derivatives of aliphatic hydrocarbons with an acetylating agent at a temperature suitable for the removal of a halogen acid therefrom, removing a constituent thus formed by said removal and acetylating the remaining halogen derivatives of aliphatic hydrocarbons by heating the residue at a temperature suitable for the production of organic acetates.

2. The process which comprises heating a mixture of halogen derivatives of aliphatic hydrocarbons with an acetylating agent at a temperature suitable for the removal of a halogen acid therefrom, removing a constituent thus formed by said removal and acetylating the remaining halogen derivatives of aliphatic hydrocarbons by heating the residue at a higher temperature suitable for the production of organic acetates.

3. The process which comprises heating a mixture of aliphatic chlorhydrocarbons with an acetylating agent at a temperature suitable to the production of olefins, removing the olefins thus formed and acetylating the remaining aliphatic chlorhydrocarbons by heating the residue at a temperature suitable for the production of organic acetates.

4. The process which comprises heating a mixture of aliphatic chlorhydrocarbons with an acetylating agent at a temperature suitable to the production of olefins, removing the olefins thus formed and acetylating the remaining aliphatic chlorhydrocarbons by heating the residue at a higher temperature suitable for the production of organic acetates.

5. The process which comprises heating a mixture of amyl and hexyl chlorids with an acetylating agent at a temperature suitable to the production of olefins, removing the olefins thus formed and acetylating the remaining amyl and hexyl chlorids by heating the residue at a temperature suitable for the production of organic acetates.

6. The process which comprises heating a mixture of amyl and hexyl chlorids with an acetylating agent at a temperature suitable to the production of olefins, removing the olefins thus formed and acetylating the remaining amyl and hexyl chlorids by heating the residue at a higher temperature suitable to the production of organic acetates.

7. The process which comprises heating a mixture of amyl and hexyl chlorids with an acetylating agent at a temperature suitable to the production of olefins, removing the olefins thus formed by distillation and acetylating the remaining amyl and hexyl chlorids by heating the residue at a temperature suitable for the production of organic acetates.

8. The process which comprises heating a mixture of amyl and hexyl chlorids with an acetylating agent at a temperature suitable to the production of olefins, removing the olefins thus formed by distillation and acetylating the remaining amyl and hexyl chlorids by heating the residue at a higher temperature suitable for the production of organic acetates.

9. The process which comprises heating a mixture of amyl and hexyl chlorids with an acetylating agent at a temperature suitable to the production of olefins, removing the olefins thus formed by distillation, acetylating the remaining amyl and hexyl chlorids by heating the residue at a temperature suitable for the production of organic acetates, and separating the resulting constituents.

10. The process which comprises heating a mixture of amyl and hexyl chlorids with an acetylating agent at a temperature suitable to the production of olefins, removing the olefins thus formed by distillation, acetylating the remaining amyl and hexyl chlorids by heating the residue at a higher temperature suitable for the production of organic acetates, and separating the resulting constituents.

11. The process which comprises heating a mixture of amyl and hexyl chlorids with an acetylating agent at a temperature suitable to the production of olefins, removing the olefins thus formed by distillation, acetylating the remaining amyl and hexyl chlorids by heating the residue at a temperature suitable for the production of organic acetates, and separating the resulting constituents by distillation.

12. The process which comprises heating a mixture of amyl and hexyl chlorids with an acetylating agent at a temperature suitable to the production of olefins, removing the olefins thus formed by distillation, acetylating the remaining amyl and hexyl chlorids by heating the residue at a higher temperature suitable for the production of organic acetates, and separating the resulting constituents by distillation.

In testimony that I claim the foregoing I have hereunto set my hand.

WALTER E. MASLAND.

Witnesses:
 FUI SPARRE,
 C. R. MUDGE.

It is hereby certified that in Letters Patent No. 1,095,013, granted April 28, 1914, upon the application of Walter E. Masland, of Wilmington, Delaware, for an improvement in "Processes of Acetylation," an error appears in the printed specification requiring correction as follows: Page 1, between lines 100 and 101, insert the paragraph—

*This reaction takes place for these particular hydrocarbons between approximately 150° to 170° C. as a minimum and 215° C. as the maximum. It is to be understood however, that these temperatures will be different for different hydrocarbons. In general it may be said that the process is carried out between the temperatures of 150° C. and 250° C. and the point at which the first step ends and the second step begins is between 130° and 180° C.;* and that the said Letters Patent should be read with this correction therein that the same may conform to the record of the case in the Patent Office.

Signed and sealed this 7th day of July, A. D., 1914.

[SEAL.]

R. F. WHITEHEAD,
*Acting Commissioner of Patents.*